R. JENNINGS.
Improvement in Drums for Heating and Ventilating.
No. 114,013. Patented April 25, 1871.

Witnesses:
P. C. Dieterich
L. S. Mabee

Inventor:
R. Jennings
Per Munn & Co.
Attorneys.

United States Patent Office.

ROYAL JENNINGS, OF SHELBYVILLE, INDIANA.

Letters Patent No. 114,013, dated April 25, 1871.

IMPROVEMENT IN DRUMS FOR HEATING AND VENTILATING.

The Schedule referred to in these Letters Patent and making part of the same.

*To all whom it may concern:*

Be it known that I, ROYAL JENNINGS, of Shelbyville, in the county of Shelby and State of Indiana, have invented a new and useful Improvement in Combined Heater and Ventilator; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
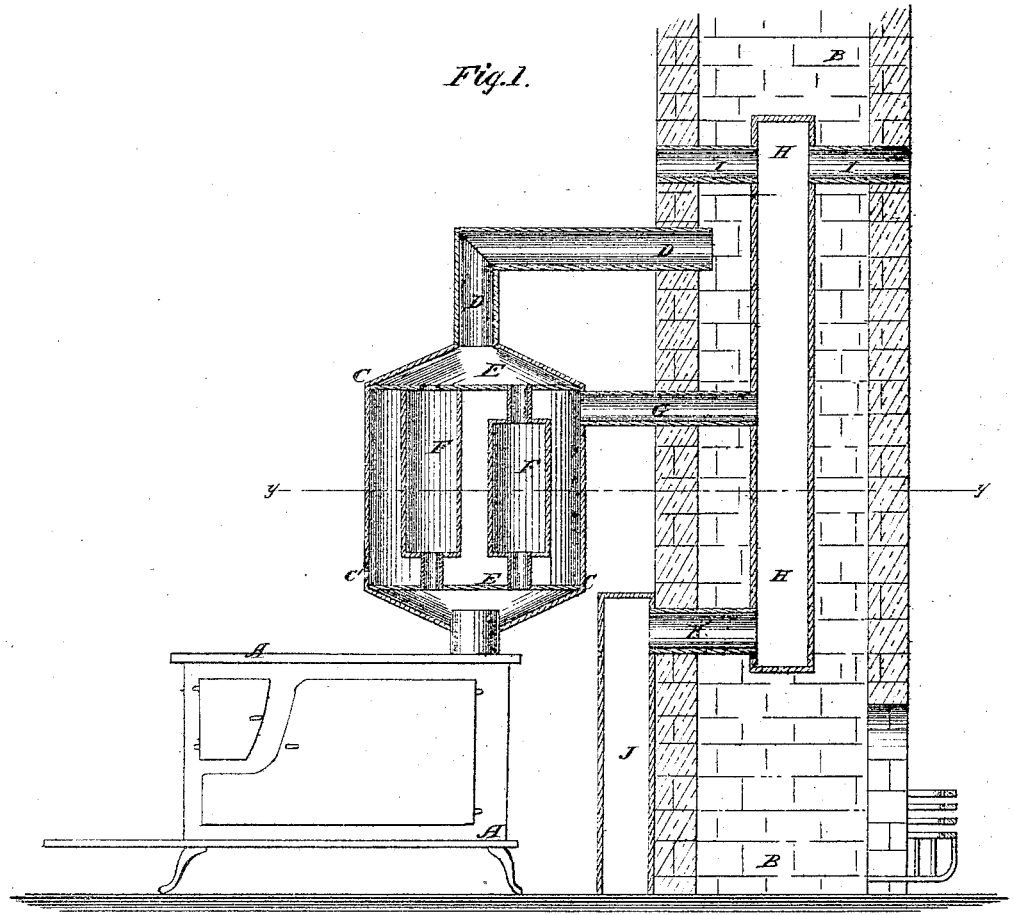
Figure 1 is a vertical longitudinal section of my improved apparatus as connected with a stove and chimney taken through the line $xx$, fig. 2.
Figure 2:
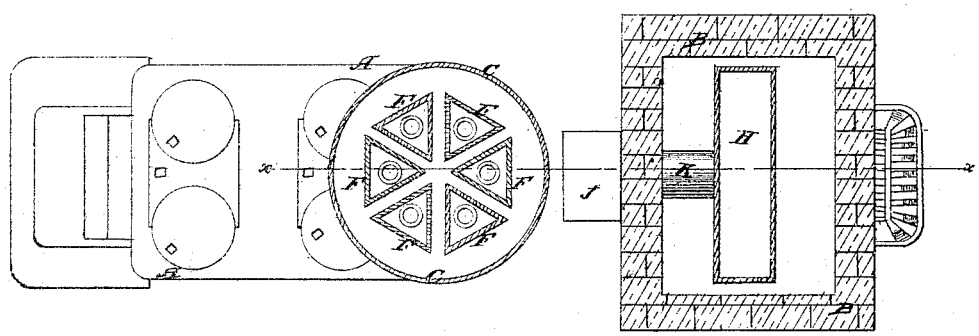
Figure 2 is a horizontal section of the same taken through the line $yy$, fig. 1.

My invention has for its object to furnish an improved apparatus for heating the rooms of a building by introducing into them a supply of pure heated air, and which shall, at the same time, be simple in construction, easily applied, and effective in operation; and It consists in the construction of the various parts of the apparatus as hereinafter more fully described.

A represents an ordinary stove, and

B represents a chimney, which may be made with or without a fire-place, as may be desired.

C is a drum, the outer case or shell of which is connected at its lower end with the egress smoke-flue of the stove.

The upper end or part of the drum C has a pipe, D, connected with it to conduct the smoke and other heated products of combustion to the chimney B.

The ends or heads of the drum C may be made conical, as shown in the drawing, or flat, as may be desired. When the upper head is made conical the pipe D should be connected with its apex; but when made flat the said pipe D may be connected with the said head or with the upper part of the side of the drum C, as may be desired.

E are partitions formed in the drum C near its upper and lower ends, as shown in fig. 1.

F are six, more or less, interior chambers, the lower ends of which are connected with a corresponding number of holes in the lower plate or partition F by short pipes or collars of a smaller diameter than the said chambers. These collars I prefer to make ribbed or corrugated to form small air-channels for the air to pass in to burn any carbon that may enter said chambers with the smoke.

The upper ends of the chambers F are connected with a corresponding number of holes in the upper plate or partition E. The chambers F may be made triangular, as shown in the drawing, or round or oval, as may be desired.

The ingress and egress openings of the chambers F being made smaller than the bodies of said chambers cause the carbon passing through to be collected or checked within the said chambers, giving it a better opportunity to be burned.

In the lower part of the case C is formed an opening, $c'$, through which the air is introduced into the lower part of the drum C to be heated by circulating around and between the chambers F, through which the heated products of combustion are passing.

The air when heated escapes from the upper part of the drum C through the pipe G, which may be connected with the upper part of the side of the drum C, or may pass in through the top part of said drum and be connected with a hole in the upper plate or partition E.

This latter construction I prefer, especially when the top of the drum C is made flat, as it enables the heated air to be introduced into the chimney above the point at which the smoke is introduced.

In the upper part of the sides of the drum C may be formed one or more holes, to allow the heated air to pass out into the room in which said drum is placed. In this case the said holes should be provided with registers, to enable the escape of the heated air to be regulated or prevented at will, and the pipe G should be provided with a damper to enable the passage of the heated air through said pipe to be regulated or prevented at will.

The other end of the pipe G is connected with a drum, H, suspended in the chimney B. The shape of the drum H is immaterial, but I prefer to make it broad and thin, so that it may not obstruct the draught of the chimney.

The drum H extends up through the chimney for any desired distance, and is provided with one or more pipes, I, leading out through the wall of the chimney and opening into the room or rooms to be heated.

The pipes I should be provided with registers, to enable the escape of the heated air to be regulated at will.

J is a pipe or passage built into or connected with the lower part of the chimney B.

The upper end of the pipe J is connected with the drum H by the pipe K, and its other end opens into the open air, so as to introduce a supply of pure cold air into the drum H to be heated and introduced into the room or rooms to be heated, thus at the same time heating and ventilating the room or rooms.

In warm weather the pipe J and drum H may be used as a cold-air passage for ventilating the room or rooms.

By this construction the heated air, while passing from the drum C to the room or rooms to be warmed through the drum H, will be all the time surrounded by the heated products of combustion passing through the chimney B. In case the fire-place is used the cold air passing in through the pipe J will be so heated while passing through the drum H as to warm the room into which it may be introduced.

Having thus described my invention,

I claim as new and desire to secure by Letters Patent—

An improved heating and ventilating apparatus, formed by the combination of the drum C, plates or partitions E, interior chambers F, smoke-pipe D, hot-air pipe G, suspended drum H, egress pipe or pipes I, and cold-air pipe J K, with each other and with a stove and chimney, substantially as herein shown and described, and for the purpose set forth.

ROYAL JENNINGS.

Witnesses:
W. H. JENNINGS.
A. RAYMOND.